US011838356B2

(12) United States Patent
Shraer et al.

(10) Patent No.: US 11,838,356 B2
(45) Date of Patent: Dec. 5, 2023

(54) WEIGHTED AUTO-SHARING

(71) Applicant: Google LLC, Mountain View, CA (US)

(72) Inventors: Alexander Shraer, Stanford, CA (US);
Kfir Lev-Ari, Kfar Saba (IL); Arif Merchant, Mountain View, CA (US);
Vishesh Khemani, Seattle, WA (US);
Atul Adya, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 11 days.

(21) Appl. No.: 17/663,618

(22) Filed: May 16, 2022

(65) Prior Publication Data
US 2022/0272148 A1 Aug. 25, 2022

Related U.S. Application Data

(63) Continuation of application No. 16/725,472, filed on Dec. 23, 2019, now Pat. No. 11,363,096, which is a continuation of application No. 15/428,844, filed on Feb. 9, 2017, now Pat. No. 10,530,844.

(60) Provisional application No. 62/345,567, filed on Jun. 3, 2016.

(51) Int. Cl.
| | |
|---|---|
| *H04L 67/1001* | (2022.01) |
| *G06F 9/50* | (2006.01) |
| *G06F 16/00* | (2019.01) |
| *G06F 16/27* | (2019.01) |
| *H04L 43/08* | (2022.01) |
| *H04L 67/148* | (2022.01) |

(52) U.S. Cl.
CPC ........ *H04L 67/1001* (2022.05); *G06F 9/5066* (2013.01); *G06F 9/5083* (2013.01); *G06F 9/5088* (2013.01); *G06F 16/00* (2019.01); *G06F 16/278* (2019.01); *H04L 43/08* (2013.01); *H04L 67/148* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 7,043,621 B2 | 5/2006 | Merchant et al. | |
| 7,421,497 B2 | 9/2008 | Rosenbach et al. | |
| 8,976,636 B1 * | 3/2015 | Martin .................. | G06F 3/0644 |
| | | | 369/30.01 |
| 2004/0230764 A1 | 11/2004 | Merchant et al. | |
| 2012/0254445 A1 | 10/2012 | Kawamoto et al. | |
| 2013/0204991 A1 | 8/2013 | Skjolsvold et al. | |

(Continued)

FOREIGN PATENT DOCUMENTS

CN 103336792 B * 11/2016 ....... G06F 17/30312

*Primary Examiner* — Jeffrey R Swearingen
(74) *Attorney, Agent, or Firm* — Honigman LLP; Brett A. Krueger

(57) ABSTRACT

Methods, systems, and apparatus for automatic sharding and load balancing in a distributed data processing system. In one aspect, a method includes determining workload distribution for an application across worker computers and in response to determining a load balancing operation is required: selecting a first worker computer having a highest load measure relative to respective load measure of the other work computers; determining one or more move operations for a partition of data assigned to the first worker computer and a weight for each move operation; and selecting the move operation with a highest weight the selected move operation.

20 Claims, 4 Drawing Sheets

(56) References Cited

U.S. PATENT DOCUMENTS

| | | | |
|---|---|---|---|
| 2013/0290249 A1* | 10/2013 | Merriman | G06F 16/278 707/610 |
| 2014/0164443 A1* | 6/2014 | Genc | G06F 16/00 707/809 |
| 2015/0249615 A1 | 9/2015 | Chen et al. | |
| 2016/0371353 A1 | 12/2016 | Serafini et al. | |
| 2017/0031908 A1 | 2/2017 | Liu et al. | |

* cited by examiner

Migration

First Worker Computer     Second Worker Computer

Replication

First Worker Computer     Second Worker Computer

De-replication

WEIGHTED AUTO-SHARING

CROSS REFERENCE TO RELATED APPLICATIONS

This U.S. patent application is a continuation of, and claims priority under 35 U.S.C. § 120 from, U.S. patent application Ser. No. 16/725,472, filed on Dec. 23, 2019, which is a continuation of U.S. patent application Ser. No. 15/428,844, filed on Feb. 9, 2017, which claims priority under 35 U.S.C. § 119(e) to U.S. Provisional Application 62/345,567, filed on Jun. 3, 2016. The disclosures of these prior applications are considered part of the disclosure of this application and are hereby incorporated by reference in their entireties.

BACKGROUND

Many storage systems, and in particular databases and key-value storage systems, partition data according to a key-space and store the partitioned data among multiple servers. Such storage schemes are prevalent in cloud-based storage systems and cloud-based distributed processing systems.

In the context of an application that distributes its work across multiple computers, partitioning the data in a manner that results in a balanced work distribution among the working computers (e.g, servers) acting on the data is desirable. One common distribution scheme is to distribute the data randomly according to a data key. This is ubiquitous in web services, where the distribution of the data for the application is managed by a load balancer in front of a fleet of interchangeable application servers.

For example, consistent hashing can be used to initially balance the number of data items stored on each server. Thereafter, a peer-to-peer load balance algorithm can be used, where each server periodically chooses random other servers and tries to remain balanced with respect to these servers by shedding load to the other servers.

SUMMARY

This specification describes technologies relating to sharding and load balancing.

In general, one innovative aspect of the subject matter described in this specification can be embodied in methods that include the actions of partitioning a data set for an application job into a plurality of partitions according to values of a key, wherein the key is an atomic unit of work placement; assigning, to each worker computer in a set of worker computers, partitions of the data set to the worker computer, wherein each worker computer receives a different set of partitions of the data set; iteratively determining workload distribution for the application job across the worker computers and determining whether a load balancing operation is require based on the workload distribution, in response to determining a load balancing operation is required: selecting a first worker computer having a highest load measure relative to a respective load measure of at least one other worker computer, for one or more partitions assigned to the first worker computer, determining one or more move operations for the partition, and, for each move operation, a weight for the move operation, selecting the move operation with a highest weight relative to the weights of each of the other move operations and implementing the selected move operation on the partition for which the move operation with the highest weight was determined. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The weighted auto-sharding move operations can provide improved load balancing, less key movements, less replication, less fragmentation of assignments, and smaller assignments than other sharding processes, such as consistent hashing. Furthermore, in implementations in which a minimum benefit is required for a movement operation to be implemented, the system can avoid implementing reassignments that would not achieve at least the minimum benefit. The method works well for both large and small number of client keys, unlike other methods that only realize efficiency for a large set of client keys, such as consistent hashing. The method also allows users to define explicit tradeoffs between imbalance and cost in a way that is optimal for a particular application. For example, for some application the cost of moving keys may be expensive, e.g., cost=#moved keys^2, while for other applications the cost may be inexpensive, e.g., cost=Sqrt(#moved keys), for some applications the benefit for reduced imbalance may be high, while for others the benefit for reduced imbalance may be low, etc. These advantages result in improvements in the technological field of distributed data storage and processing.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
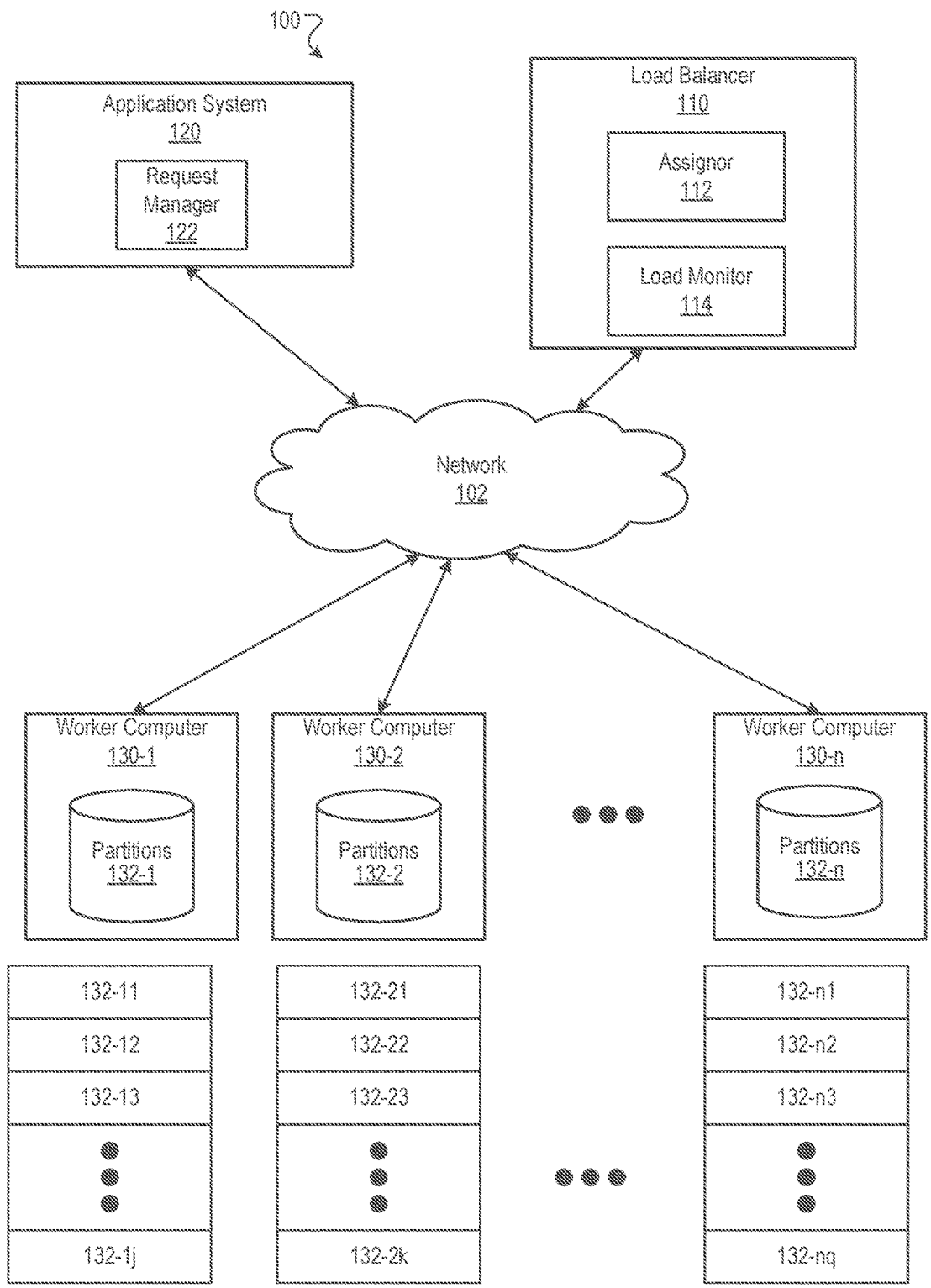
FIG. 1 is a block diagram of a system that performs weighted auto-sharding of data.

FIG. 1 is a block diagram of a system that performs weighted auto-sharding of data. A computer network 102, such as a local area network (LAN), wide area network (WAN), the Internet, or a combination thereof, connects a load balancer 110, and application system 120 and a set of worker computers 130-1 . . . n that work in connection with the application system 120.

The application system 110 may be a single computer executing an application, or may be multiple computers that implement an application or suite of applications in a distributed manner. Example applications that may be implemented are speech recognizers, document processing applications, e-mail applications, or any other application that may require storage of a large set of data across multiple worker computers 130. An example worker computer 130 is a sever computer that receives and serves requests from the application system 120.

The role of the worker computers 130 is dependent on the role assigned to them by the application system 120. For example, a worker computer 130 may perform only storage management functions for the data that it manages, such as read operations, write operations, deletion operations, and the like. Alternatively, a worker computer 130 may perform more complex operations, such as any number of operations that may be assigned in a distributed parallel processing system. Examples of such operations include search operations, sorting operations, image processing operations, etc.

Figure 2:
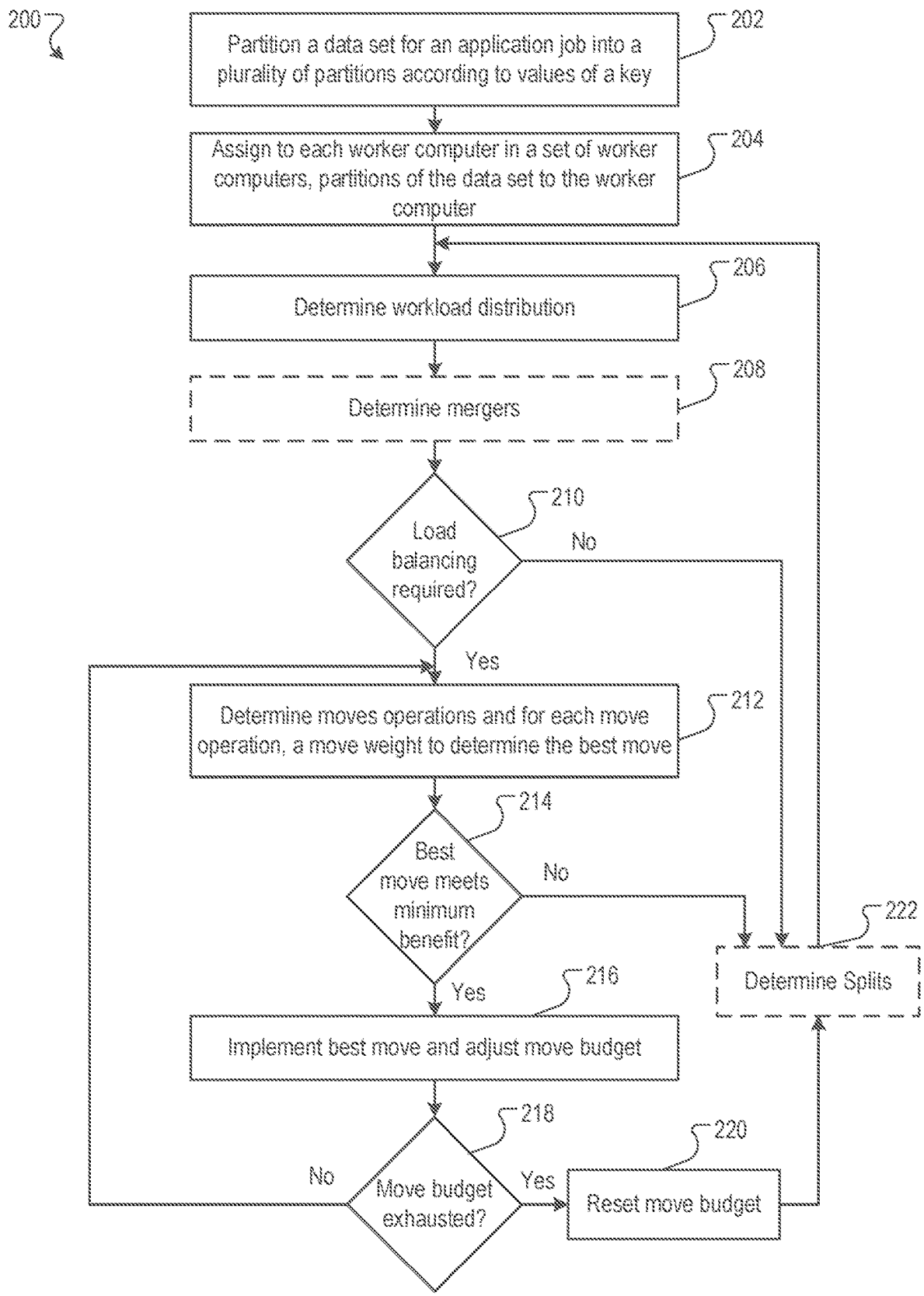
FIG. 2 is a flow diagram of an example process for performing weighted auto-sharding of data.

Each worker computer 130 has a corresponding set of partitions 132 that are assigned to the worker computer 130. As illustrated in FIG. 2, each set of partitions 132 may include multiple partitions. For example, the set of partitions 132-1 may include partitions 132-11, 132-12 . . . 132-1$j$; the set of partitions 132-2 may include partitions 132-21, 132-22 . . . 132-2$k$, and so on. All of the partitions of all of the data sets 132 form the data set for the application job that is executed by the application system 120. Additionally, the number of partitions in each set need not be the same, as indicated by the j, k and q indices. As will be described below, because individual partitions may be merged with other partitions, migrated, replicated, or split, the number of partitions on any one worker computer may vary over time.

The load balancer 110 includes an assignor 112 that performs initial assignments and causes the execution of merger operations, move operations (migrations, replications and de-replications, as will be explained below), and split operations. The load monitor 114 monitors the loads of the worker computers 130 to determine whether merger operations, move operations and split operations are to be performed. The example architecture of the load balancer 110 is illustrative, and other functional distributions that perform operations described below may also be used.

The load balancer 110 splits the application system's work and data across the set of worker computers 130 within a data center such that the load is balanced across the worker computers 130. The unit of sharding is a data key chosen by the application running in the application system 120. Keys are an atomic unit of work placement. The keys may be fine-grained, e.g., user IDs, or coarse-grained, e.g, languages in a speech recognizer.

Once the data are distributed to the partitions 132, the request manager 122 allows the application system 120 to direct requests for a key to the worker computer 130 assigned that key. The request manager 122 can also provide data describing the requests for particular key values and the addresses of the corresponding worker computers 130 for the requests to the load monitor 114. Using this data, the load monitor determines whether load balancing operations need to be performed.

Operation of the load balancer 110 is describe with reference to FIG. 2, which is a flow diagram of an example process 200 for performing weighted auto-sharding of data. In general, the process 200 considers, in some implementations, (1) minimum and maximum number of key-ranges per worker computer; (2) a minimum and maximum number of replications among worker computers; (3) load measure thresholds for performing load balancing, (4) a budget limit, e.g., key churn, for a series of move operations, and (5) a marginal gain for each move, e.g., a key churn limit, a minimum benefit, etc. Additional factors, or even fewer factors, can be considered when implementing the process 200.

The process 200 partitions a data set for an application job into a plurality of partitions according to values of a key (202). For example, the assignor 112 may generate a hash value from the key value for data, and distribute the data to a corresponding worker computer associated with the hash value. To illustrate, assume a set of records are to be distributed to the worker computers, and each record includes a User ID key value. Each User ID key value is hashed, and a modulo operation is applied to the hash value. Each worker computer 130 is associated with a remainder value, and receives the record for which the modulo operation generates the remainder value.

The process 200 then assigns, to each worker computer in a set of worker computers, partitions of the data (204). The data provided to each worker computer is divided into partitions 132, and each partition corresponds to a continuation range of values, e.g., hashed key values. Each partition 132, in some implementations, is initially different from each other partition 132. For example, assume that there are 10 worker computers, and there are initially 10 partitions for each worker computers 130. If there are 1,000 modulo values generated, then each partition initially correspond to 10 contiguous values, e.g., 1 . . . 10 for 132-11; 11-20 for 132 . . . 12; and so on. In other implementations, partitions may have an initial set of replications, e.g., for redundancy or load sharing.

The process 200 then begins a series of iterative operations that perform one or more of the operations 206-222. Some of the operations, such as the merger and splitting operations, may be optional, as indicated by the dashed process boxes 208 and 222.

The process 200 determines the workload distribution (206). In operation, the process 200 iteratively determines the workload distribution for the application job across the worker computers periodically, e.g., n minutes, hours, or by some other periodic metric. During each period, the load monitor 114 receives reporting data from the request manger 122 and can also receive data from each worker computer 130 that describes the load of the worker computer 130. In some implementations, the load measure for each worker computer may be a processing system utilization measure. Example processing system utilization measures may be CPU utilization, power consumption, latency, or any other metric that indicates the load of the worker computer 130.

In other implementations, the load measure may be independent of the processing system utilization measure. For example, a load measure may be generated from a constituent load measure for each partition assigned to a worker computer. This constituent load measure may be based on the number or reads, writes, or other operations directed to data stored in the partition.

In another implementation, the processing system utilization measure for the worker computer 130 may be apportioned according to the constituent load measures of the partitions. For example, assume that a processing system utilization measure indicates the worker computer is operating at 110% of a desired load value, and there are four partitions assigned to the worker computer. The relative percentage of operations performed by the worker computer for each of the four partitions are 50%, 20%, 10% and 20%, respectively. Accordingly, the four partitions are determined to require the following processing system utilization: 55%, 22%, 11% and 22%.

Other appropriate ways of determining a workload distribution can also be used, such as by measuring latency times, number of operations per unit time period, etc.

The process 200 determines mergers (208). Mergers of partitions are optional, and may be implemented before a load balancing operation is performed. A merger may be performed to merge two adjacent partitions into a single partition. Two partitions are adjacent if they collectively define a range of contiguous key hash values.

To determine if a merger is to be performed in partitions 132 assigned to a worker computer, the process 200, for each partition of the worker computer 130, determines a constituent load measure for the partition. The constituent load measure may be determined as described above. The process 200 then selects pairs of adjacent partitions, and for each pair of adjacent partitions for which a sum of the constituent load measures of the partitions does not meet a load measure merger threshold, merges the adjacent partitions into a single partition. An example load measure merger threshold is an average of constituent load measures of all partitions.

Mergers may be constrained so that a merger does not result in a number of remaining partitions on the worker computer being less than a minimum partition threshold. The threshold is greater than unity, and may be selected according to any number of appropriate selection criteria. The minimum partition threshold may be a percentage of the number of initial partitions, or may be a set number (e.g., 20), etc., or may be based on a minimum number of replicas per partition.

In some implementations, the process 200 may merge two adjacent partitions when one partition is on a first worker computer and the second partition is on a second worker computer. For example, assume the partitions 131-1$j$ on worker computer 130-1 and 132-21 on worker computer 130-2 are adjacent partitions, and that the sum of the constituent load measures of the partitions does not meet the load measure merger threshold. The process 200 will then merge the adjacent partitions into a single partition and assign the merged partition one of the first and second worker computer that has a lowest load measure.

The process 200 then determines if a load balancing is required (210). In some implementations, the process 200 determines a load balancing operation is required if at least one worker computer has a load measure that meets a maximum load measure threshold. The maximum load measure threshold quantifies a threshold for the load measure that is determined. For example, if the load measure is latency, and the maximum load measure is a maximum latency time, then a worker computer 130 with a latency time that exceeds the maximum latency time results in process 200 determining a load balancing operation is required. Likewise, if the load measure is CPU utilization, and the maximum load measure is a maximum CPU utilization value, then a worker computer 130 with a CPU utilization that exceeds the maximum CPU utilization results in process 200 determining a load balancing operation is required.

In response to determining a load balancing operation is required, the process 200 determines move operations and for each move operation, a move weight to determine the best move (212). In some implementations, the process 200 determines move operations for only a worker computer having a highest load measure relative to respective load measure of the other work computers. In other implementations, however, move operations can be considered for worker computers that are in a top subset of worker computers with high load measures, e.g., the top x %, or all worker computers with loads above a threshold load measure. This may include the top n worker computers, or even a second-most loaded worker computer instead of a first-most loaded worker computer. In a variation of this implementation, the partitions in all worker computers with loads above a threshold load measure may be considered for moves.

For example, with reference to FIG. 1, assume that the worker computer 130-1 has the highest load measure, and assume for this example the partitions for only the worker computer with the highest load measure are processed for possible moves. The process 200 then determines, for one or more partitions 132 assigned to the first worker computer 130-1, one or more move operations for the partition. Furthermore, for each move operation, the process 200 determines a weight based on benefits and costs determined for the move operation.

For example, the process 200 may determine for each of the partitions 132-11 a migration move that migrates the partition 132-11 from the first worker computer 130-1 to a second worker computer. In some implementations, the second worker computer 130 is the worker computer with the lowest load measure relative to respective load measure of the other work computers. In other implementations, two or more worker computers with the lowest relative load measures may be considered as possible recipients of partitions for move operations. Finally, the second worker computer may, in some situations, be a worker computer that does not have the lowest relative load measure.

The benefit may be determined based on the estimate reduction in the load on the worker computer from which the partition is migrated. The benefit is thus proportional to a reduction in load measure in the worker computer that will result from the move operation. For example, if moving the partition 132-11 from the worker computer 130-1 will decrease the latency by 0.5 microseconds, the benefit is then a 0.5 microsecond decrease in latency. Other ways of measuring benefits can also be used.

The cost may be measured in proportional to an amount of key values that will be reassigned from the move operation. For example, if the benefit obtained by moving a relatively large number of keys is very small, then the cost associated with overhead of the move effectively reduces the gain realized by the benefit.

The weight for the move is based on the cost and the benefit. In some implementations, the weight is the ratio of the benefit to the cost, i.e., $$\text{Weight(move)}=\text{Benefit(move)}/\text{Cost(move)}$$

Other functions for determine a weight may be used. Additionally, in some implementations, the weight may simply be the reciprocal of the cost and the benefit is ignored, or the weight may simply be the benefit and the cost is ignored.

Another move is a replication move. A replication occurs when a partition is copied from one worker computer to another worker computer, and the worker computer on which the replication is made shares in the workload for that partition. For example, if a partition exists only for one worker computer, replicating the partition on another worker computer reduces the load on the original worker computer by 50% of the load for the partition. A replication may occur on another worker computer when that worker computer does not already have the partition assigned to it.

Another possible move is a de-replication move. A de-replication move eliminates the partition on a computer. De-replication moves have little cost relative to other moves, as there is no requirement for migration or copying of the partition to another worker computer store. Instead, the partition assigned to the worker computer with the highest load measure is simply deleted.

The move operations and weights may be determined for only the partition with the highest constituent load measure, or, alternatively, may be determined for each partition assigned to the worker computer with the highest relative load measure. In yet another implementation, the top y % of partitions in the worker computer(s) being processed for possible moves may be considered.

Moves, replications and de-replications are described in more detail with reference to FIGS. 3A-3D below.

The move operation with highest weight relative to the weights of each of the other move operations is selected. The move may then be implemented by instructing the worker computers to perform the move operations (216). Alternatively, the process 200 may optionally determine whether the selected move meets a minimum benefit (214). For example, if a selected move operation which has the highest weight does not realize a minimum benefit, it may be ignored. This ensures that move operations that result in only marginal increases that are considered to not be worth an attendant cost are not implemented. In another implementation, the process 200 may determine whether the selected move exceeds a maximum cost. For example, if a selected move operation which has the highest weight exceeds a maximum cost, it may be ignored. This ensures that move operations that have a very high cost can be ignored, even if their resulting weight is the highest.

Another gating function of a move operation is a comparison of a new estimated load measure of a second worker computer to which a partition is moved or replicated (or workload increased by a de-replication on first worker computer) to the original load measure of the first worker computer before the move operation. If the new estimated load measure of the second worker computer is equal to or exceeds the original load measure of the first worker, then the move is not executed. This is because that while the first worker computer may benefit from the move, the overall benefit to the set of worker computers 130 would be offset by the even higher resulting load measure on the second worker computer.

In some implementations, a move budget may be used to limit the number of moves that may be implemented. For example, a key churn metric may be used to determine a maximum number of keys that may be moved during a series of move operations. Key churn indicates the percentage of the entire key space (and thus the percentage of the entire data set) that is affected by and assignment change. Each time a move is implemented, the cost of the move in terms of key values is subtracted from the budget. The use of move budget reflects the backend and overhead costs associated with move operations that may not be directly reflected by the resulting costs and benefits of each selected move that is implemented.

In some implementations, the budget cost for a move can also be considered when determining to select a move. For example, the process 200 can impose a maximum budget cost per move, e.g., 10% or the entire budget, or some other percentage. If the maximum budget cost for the move is exceeded, the move is ignored. This ensures that move operations that have a very high budget cost can be ignored, even if their resulting weight is the highest. The rationale is that multiple less-budget costly moves in the aggregate are more likely to realize a better overall load balancing improvement than a single, very high-budget cost move.

In another implementation, instead of a maximum cost per move criterion, a bound on aggregate cost criterion may be used. In this implementation, the process 200 may determine whether the cost of the move with the highest weight together with the cost of the moves that have already been made, in aggregate, exceeds the move budget. If not, the move may be made. If so, then an alternate move with a lower weight is considered.

The process 200 determines if the move budget is exhausted (218). If there is remaining move budget, then the process 200 returns to step 212. However, if the budget is exhausted, then the move budget is reset (220), and the workload distribution is again determined after a period of time.

Optionally, the process may determine splits of partitions (222). Partitions that have a high constituent load measure may be split to provide additional load balancing options for the next round of load balancing. A partition may be split when the partition's constituent load measure exceeds a load measure split threshold. An example load measure split threshold is a double of an average of constituent load measures of all partitions.

For each partition for which the constituent load measure exceeds the load measure split threshold, the process 200 splits the partition into two separate partitions. In some implementations, the splitting of the partition occurs only if the splitting will not result in a number of partitions on the worker computer being greater than a maximum partition threshold.

More generally, a partition may be split into N parts, where N is 2 or greater. In some implementations, the value of N may depend on the constituent load of the partition to be split, and N is proportional to the constituent load. For example, if a partition has a constituent load of three times the average constituent load, the partition is split into three separate partitions. Even more generally, the number of partitions may be determined by a rounding function that takes as input the multiple of the average constituent load, e.g., $$N(P) = \text{Round}(A(P), 0)$$

where:

P is the partition; and

A(P) is the multiple of the partition's P constituent load relative to the average constituent load.

Other ways of determining split thresholds and a split cardinality can also be used.

In some implementations, the partition is split at split points that result in equal sized partitions. For example, a split at the mid-point of a partition is used for a split into two partitions; splits at the third and two-thirds points of a partition is used for a split into three partitions, and so on.

In other implementations, the constituent load of a partition is attributed to the individual key values of the partition, and split(s) that result in a substantially equal constituent load for each split partition are calculated and implemented. For example, assume a partition has a constituent load of 3.1 times the average constituent load, and the partition includes 10,000 key values ranging from 1 to 10,000. To equally divide the partition into partitions that will have substantially equal ranges, the following ranges are determined.

Partition 1: Keys 1-4,000;

Partition 2: Keys 4,001-8,000; and

Partition 3: Keys 8,001-10,000.

While splits and mergers have been illustrated being separate from the other moves of replication, de-replication and migration, in other implementations they can instead be candidate moves that are weighted and evaluated against the replication, de-replication and migration moves. Furthermore, the moves described above are not exhaustive, and other types of moves, or combinations of moves, can be implemented as long as weights are calculated for comparison. For example, another type of move may be a combination of a migration and replication: a partition may be migrated from one worker computer to two or more other worker computers, essentially combining a migration and replication. Yet another move may be an allocation of another worker computer to be added to the set of worker computers and to be assigned one or more partitions by the moves described above. Still other types of moves may be used as well.

FIGS. 3A-3D are block diagrams that illustrate move operations that can be performed during auto-sharding. Each rectangle graphically represents a constituent load (vertical) and a number of key values (horizontal) associated with a respective partition.

Figure 3A:
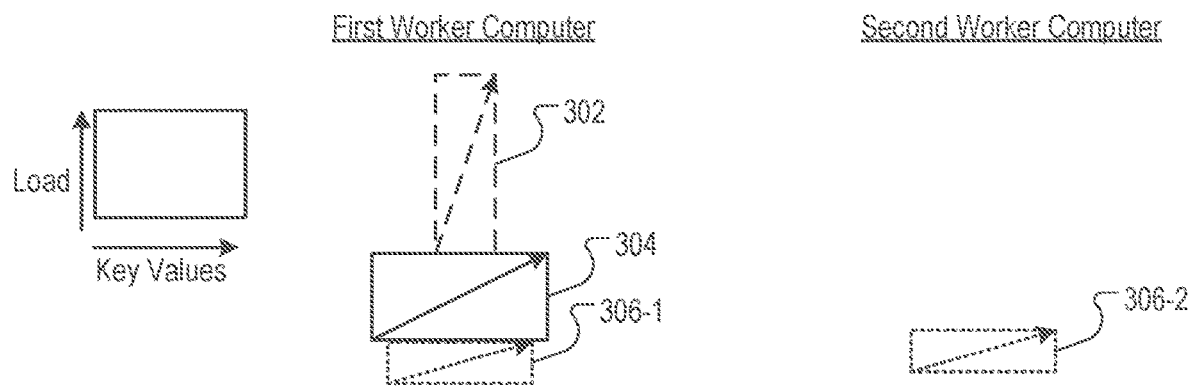
FIGS. 3A-3D are block diagrams that illustrate move operations that can be performed during auto-sharding.

FIG. 3A represents the workload distribution for a first worker computer and a second worker computer determined by the load monitor. The first worker computer has three partitions 302, 304 and 306-1, and the second worker computer has one partition, 306-2. The partitions 306-2 is a replication of the partition 306-1, and being as there is only one replication, the workload for the partition is shared equally by the first and second worker computers. As indicated by FIG. 1, the load measure for the first worker computer is much higher than the load measure for the second worker computer. Assume that the first worker computer has a highest load measure of multiple different worker computers, some of which are not depicted in FIG. 3A, and that the second worker computer has the lowest load measure of the multiple different worker computers.

Figure 3B:
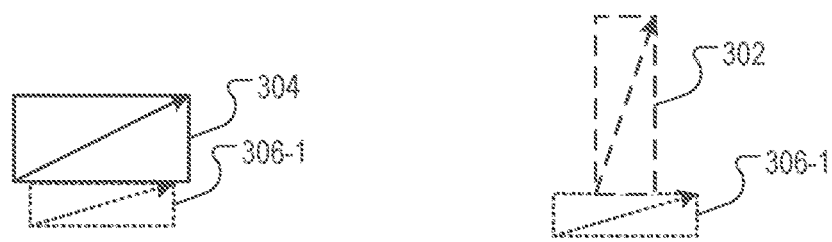

FIG. 3B illustrates the result of a migration of the partition 302 from the first worker computer to the second worker computer. This results in a decrease in the load on the first worker computer and a corresponding increase on the second worker computer.

Figure 3C:
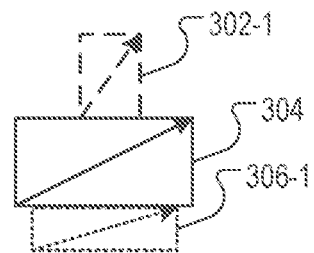
Figure 3C:
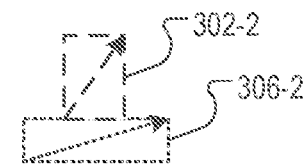

FIG. 3C illustrates the result of a replication of the partition 302 on the second worker computer. This results in a 50% decrease in the constituent load of the partition 302 on the first worker computer and a corresponding increase on the second worker computer.

Figure 3D:
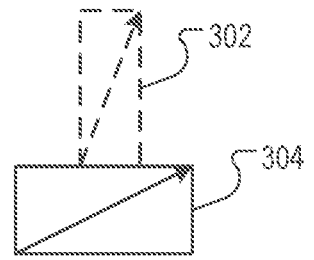
Figure 3D:

FIG. 3D illustrates the result of a de-replication of the partition 306-2 on the first worker computer. This results in a decrease in the constituent load of the partition 306 on the first worker computer and a corresponding increase on the second worker computer. While each move in FIGS. 3B-3D has a corresponding benefit, the corresponding cost is also taken into account when selecting the move. Accordingly, a move operation with a highest raw benefit may not always be the move operation that is selected. For example, a migration operation is likely to be the selected move operation when the partition being moved does not have an extremely high constituent load measure. Conversely, a replication operation of a partition is likely to be the selected move operation when the partition being replicated does have an extremely high constituent load measure. Finally, the de-replication has very little cost, and this is very likely to be chosen over other move operations unless the de-replication operation results in the new load measure of the second worker computer (shown in FIG. 3)) exceeding the original load measure of the first worker computer (shown in FIG. 3A).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g, magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g, a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; and magnetic disks.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication. e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by data processing hardware that causes the data processing hardware to perform operations comprising:
    partitioning a data set for an application job into a plurality of partitions based on a key;
    assigning, to each worker computer in a set of worker computers, one or more partitions of the plurality of partitions;
    receiving, from each respective worker computer in the set of worker computers, a respective load measure indicating a computational load of the respective worker computer;
    determining, using the respective load measure of each respective worker computer, a weight of a move operation for moving at least one partition from a first worker computer of the set of worker computers to a second worker computer of the set of worker computers;
    determining that the weight of the move operation satisfies a threshold; and
    in response to determining that the weight of the move operation satisfies the threshold, moving the at least one partition from the first worker computer of the set of worker computers to the second worker computer of the set of worker computers.

2. The method of claim 1, wherein the key comprises an atomic unit of work placement.

3. The method of claim 1, wherein each worker computer in the set of worker computers receives a different one or more partitions of the plurality of partitions.

4. The method of claim 1, wherein the operations further comprise determining an initial workload distribution for the application job to each worker computer in the set of worker computers.

5. The method of claim 1, wherein the respective load measure of the first worker computer is higher than the respective load measure of each other worker computer in the set of worker computers.

6. The method of claim 1, wherein the operations further comprise:
    determining, for each partition, a constituent load measure for the partition;
    determining pairs of adjacent partitions, each pair comprising two partitions that collectively have a contiguous range of key values; and
    for each pair of adjacent partitions for which a sum of the constituent load measures of the partition does not meet a load measure merger threshold, merging the adjacent partitions into a single partition.

7. The method of claim 6, wherein merging the adjacent partitions into a single partition occurs prior to receiving, from each respective worker computer in the set of worker computers, the respective load measure.

8. The method of claim 1, wherein the respective load measure of the second worker computer is lower than the respective load measure of each other worker computer in the set of worker computers.

9. The method of claim 1, wherein the first worker computer of the set of worker computers is assigned a different number of partitions than the second worker computer of the set of worker computers.

10. The method of claim 1, wherein determining the weight of the move operation comprises determining a ratio of a benefit of the move operation to a cost of the move operation.

11. A system comprising:
data processing hardware; and
memory hardware in communication with the data processing hardware, the memory hardware storing instructions that when executed on the data processing hardware cause the data processing hardware to perform operations comprising:
partitioning a data set for an application job into a plurality of partitions based on a key;
assigning, to each worker computer in a set of worker computers, one or more partitions of the plurality of partitions;
receiving, from each respective worker computer in the set of worker computers, a respective load measure indicating a computational load of the respective worker computer;
determining, using the respective load measure of each respective worker computer, a weight of a move operation for moving at least one partition from a first worker computer of the set of worker computers to a second worker computer of the set of worker computers;
determining that the weight of the move operation satisfies a threshold; and
in response to determining that the weight of the move operation satisfies the threshold, moving the at least one partition from the first worker computer of the set of worker computers to the second worker computer of the set of worker computers.

12. The system of claim 11, wherein the key comprises an atomic unit of work placement.

13. The system of claim 11, wherein each worker computer in the set of worker computers receives a different one or more partitions of the plurality of partitions.

14. The system of claim 11, wherein the operations further comprise determining an initial workload distribution for the application job to each worker computer in the set of worker computers.

15. The system of claim 11, wherein the respective load measure of the first worker computer is higher than the respective load measure of each other worker computer in the set of worker computers.

16. The system of claim 11, wherein the operations further comprise:
determining, for each partition, a constituent load measure for the partition;
determining pairs of adjacent partitions, each pair comprising two partitions that collectively have a contiguous range of key values; and
for each pair of adjacent partitions for which a sum of the constituent load measures of the partition does not meet a load measure merger threshold, merging the adjacent partitions into a single partition.

17. The system of claim 16, wherein merging the adjacent partitions into a single partition occurs prior to receiving, from each respective worker computer in the set of worker computers, the respective load measure.

18. The system of claim 11, wherein the respective load measure of the second worker computer is lower than the respective load measure of each other worker computer in the set of worker computers.

19. The system of claim 11, wherein the first worker computer of the set of worker computers is assigned a different number of partitions than the second worker computer of the set of worker computers.

20. The system of claim 11, wherein determining the weight of the move operation comprises determining a ratio of a benefit of the move operation to a cost of the move operation.

* * * * *